US010941691B2

(12) United States Patent
Sung et al.

(10) Patent No.: US 10,941,691 B2
(45) Date of Patent: Mar. 9, 2021

(54) ON-BOARD VEHICLE HYDROGEN GENERATION AND USE IN EXHAUST STREAMS

(71) Applicant: BASF CORPORATION, Florham Park, NJ (US)

(72) Inventors: Shiang Sung, New York, NY (US); Garo Khanarian, Princeton, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/591,916

(22) Filed: Oct. 3, 2019

(65) Prior Publication Data

US 2020/0102871 A1 Apr. 2, 2020

Related U.S. Application Data

(63) Continuation of application No. PCT/IB2018/052299, filed on Apr. 3, 2018.

(60) Provisional application No. 62/481,230, filed on Apr. 4, 2017.

(51) Int. Cl.
*F01N 3/035* (2006.01)
*F01N 3/20* (2006.01)
*F01N 3/28* (2006.01)

(52) U.S. Cl.
CPC .......... *F01N 3/2073* (2013.01); *F01N 3/035* (2013.01); *F01N 3/2086* (2013.01); *F01N 3/2828* (2013.01); *F01N 2240/22* (2013.01); *F01N 2330/30* (2013.01); *F01N 2610/02* (2013.01); *F01N 2610/04* (2013.01); *F01N 2610/1406* (2013.01)

(58) Field of Classification Search
CPC ............ B01D 53/9409; B01D 53/9418; B01D 53/944; B01D 2251/202; B01D 2257/404; B01D 2257/502; B01D 2257/702; B01D 2258/012; B01J 7/00; F01N 2610/04; F01N 3/103; F01N 3/2066; F01N 3/206; F01N 2240/32; F01N 2370/00; F01N 2610/00; C01B 3/042; C01B 3/045
See application file for complete search history.

(56) References Cited

U.S. PATENT DOCUMENTS

| 3,030,181 | A | | 4/1962 | Milton |
| 3,779,014 | A | * | 12/1973 | Nohira ...................... F01N 3/18 |
| | | | | 60/286 |
| 4,440,871 | A | | 4/1984 | Lok et al. |
| 4,544,538 | A | | 10/1985 | Zones |
| 5,262,023 | A | * | 11/1993 | Sayama .................. C01B 3/042 |
| | | | | 204/157.5 |
| 5,272,871 | A | * | 12/1993 | Oshima ................. B01F 5/0451 |
| | | | | 60/274 |
| 5,407,761 | A | | 4/1995 | Ovshinsky et al. |
| 5,658,449 | A | * | 8/1997 | Benz ....................... B01B 1/005 |
| | | | | 205/637 |
| 6,162,415 | A | | 12/2000 | Liu et al. |
| 6,171,556 | B1 | | 1/2001 | Burk et al. |
| 6,193,929 | B1 | | 2/2001 | Ovshinsky et al. |
| 6,709,644 | B2 | | 3/2004 | Zones et al. |
| 7,229,597 | B2 | | 6/2007 | Patchett et al. |
| 7,264,789 | B1 | | 9/2007 | Verduijn et al. |
| 7,704,475 | B2 | | 4/2010 | Bull et al. |
| 7,998,423 | B2 | | 8/2011 | Boorse et al. |
| 8,281,577 | B2 | * | 10/2012 | Tanoura ................ F01N 13/009 |
| | | | | 60/301 |
| 8,404,203 | B2 | | 3/2013 | Bull et al. |
| 8,475,722 | B2 | | 7/2013 | Nakanishi et al. |
| 9,011,807 | B2 | | 4/2015 | Mohanan et al. |
| 9,017,626 | B2 | | 4/2015 | Tang et al. |
| 9,242,238 | B2 | | 1/2016 | Mohanan et al. |
| 9,321,042 | B2 | | 4/2016 | Hoke et al. |
| 9,352,307 | B2 | | 5/2016 | Stiebels et al. |
| 9,517,456 | B2 | | 12/2016 | Patchett et al. |
| 9,757,717 | B2 | | 9/2017 | Patchett et al. |
| 2001/0049339 | A1 | | 12/2001 | Schafer-Sindlinger et al. |
| 2002/0002905 | A1 | | 1/2002 | Umino et al. |

(Continued)

FOREIGN PATENT DOCUMENTS

DE 4103668 8/1992
EP 0640378 3/1995

(Continued)

OTHER PUBLICATIONS

Alfred K. Hill, Laura Torrente-Murciano; "Low temperature $H_2$ production from ammonia using ruthenium-based catalysts: Synergetic effect of promoter and support," Applied Catalysis B: Environmental 172-173 (2015) 129-135.

N. Itoh, A. Oshima, E. Suga, T. Sato;"Kinetic enhancement of ammonia decomposition as a chemical hydrogen carrier in palladium membrane reactor," Catalysis Today 236(2014)70-76.

William I. F. David, Joshua W. Makepeace, Samantha K. Callear, Hazel M. A. Hunter, James D. Taylor, Thomas J. Wood, Martin O. Jones, J, "Hydrogen production from ammonia using sodium amide,". Am. Chem. Soc. 2014, 136 (38).

(Continued)

*Primary Examiner* — Timothy C Vanoy
(74) *Attorney, Agent, or Firm* — Finnegan, Henderson, Farabow, Garrett & Dunner, LLP

(57) ABSTRACT

An integrated vehicle on-board system configured to generate hydrogen and to introduce the generated hydrogen into an exhaust gas stream of an internal combustion engine, the system including a water-splitting article configured to split water into hydrogen and oxygen and a hydrogen injection article configured to introduce the hydrogen into the exhaust gas stream, is effective for the abatement of carbon monoxide and/or hydrocarbons and/or nitrogen oxides. The introduction of hydrogen may be intermittent and/or during a cold-start period.

21 Claims, 7 Drawing Sheets

(56) References Cited

U.S. PATENT DOCUMENTS

| | | | |
|---|---|---|---|
| 2002/0166546 A1* | 11/2002 | Andrews | F01N 5/02 123/556 |
| 2004/0241507 A1 | 12/2004 | Schubert et al. | |
| 2004/0261398 A1* | 12/2004 | Childs | F01N 3/005 60/275 |
| 2007/0246351 A1* | 10/2007 | Smola | C25B 1/02 204/278 |
| 2007/0274892 A1 | 11/2007 | Duvinage et al. | |
| 2008/0003470 A1 | 1/2008 | Christenson et al. | |
| 2008/0196588 A1 | 8/2008 | Gretta et al. | |
| 2008/0257751 A1 | 10/2008 | Smola et al. | |
| 2008/0274873 A1 | 11/2008 | Schubert | |
| 2009/0107116 A1 | 4/2009 | Barber et al. | |
| 2009/0217641 A1* | 9/2009 | Lloyd | F01N 3/206 60/39.12 |
| 2009/0263296 A1 | 10/2009 | Taques | |
| 2009/0285740 A1 | 11/2009 | Sobolevskiy et al. | |
| 2010/0024403 A1 | 2/2010 | Johannessen et al. | |
| 2010/0024542 A1 | 2/2010 | Yen et al. | |
| 2010/0186375 A1 | 7/2010 | Kazi et al. | |
| 2010/0251700 A1 | 10/2010 | Wan et al. | |
| 2011/0008694 A1 | 1/2011 | Tange et al. | |
| 2011/0236790 A1 | 9/2011 | Schubert | |
| 2013/0047584 A1 | 2/2013 | Park | |
| 2014/0363358 A1 | 12/2014 | Udd et al. | |
| 2016/0136626 A1 | 5/2016 | Phillips et al. | |
| 2016/0230255 A1 | 8/2016 | Young et al. | |
| 2016/0298514 A1 | 10/2016 | Raux | |
| 2016/0310897 A1 | 10/2016 | Tsuji et al. | |
| 2016/0340182 A1 | 11/2016 | Hosono et al. | |
| 2016/0348556 A1 | 12/2016 | Suyama | |

FOREIGN PATENT DOCUMENTS

| | | |
|---|---|---|
| EP | 2230001 | 9/2010 |
| FR | 2941499 | 7/2011 |
| GB | 868846 | 5/1961 |
| JP | H06146873 | 5/1994 |
| JP | 2006136776 | 6/2006 |
| JP | 2010203335 | 6/2006 |
| JP | 2010203335 | 9/2010 |
| KR | 970070445 | 11/1997 |
| KR | 20050115420 | 12/2005 |
| KR | 20100098143 | 9/2010 |
| KR | 101076841 | 10/2011 |
| KR | 101553587 | 9/2015 |
| WO | WO2014073576 | 5/2014 |
| WO | WO2015145181 | 10/2015 |
| WO | WO2016034401 | 3/2016 |
| WO | WO2016070090 | 5/2016 |
| WO | WO2016138418 | 9/2016 |
| WO | WO2017019958 | 2/2017 |
| WO | WO2018185661 | 10/2018 |

OTHER PUBLICATIONS

Irena Short, Ashok Sahgal, Walter Hayduk, "Solubility of ammonia and hydrogen sulfide in several polar solvents,", J. Chem. Eng. Data 1983, V28(1), 63-66.

"Ammonia for fuel update," New Energy and Fuel, Blog entry published Oct. 18, 2011; available online at https://newenergyandfuel.com/http:/newenergyandfuel/com/2011/10/18/ammonia-for-fuel-.

"Why on-board hydrogen generators won't boost your mileage," Blog entry published Aug. 4, 2008; available at https://www.autoblog.com/2008/08/04/why-on-board-hydrogen-generators-wont-boost-your-mileage/.

Kim et al. "Development on New Catalyst Technology for Compact SCR Modularization for Ship", The Korean Society of Industrial and Engineering Chemistry 2016 Spring Meeting.

* cited by examiner

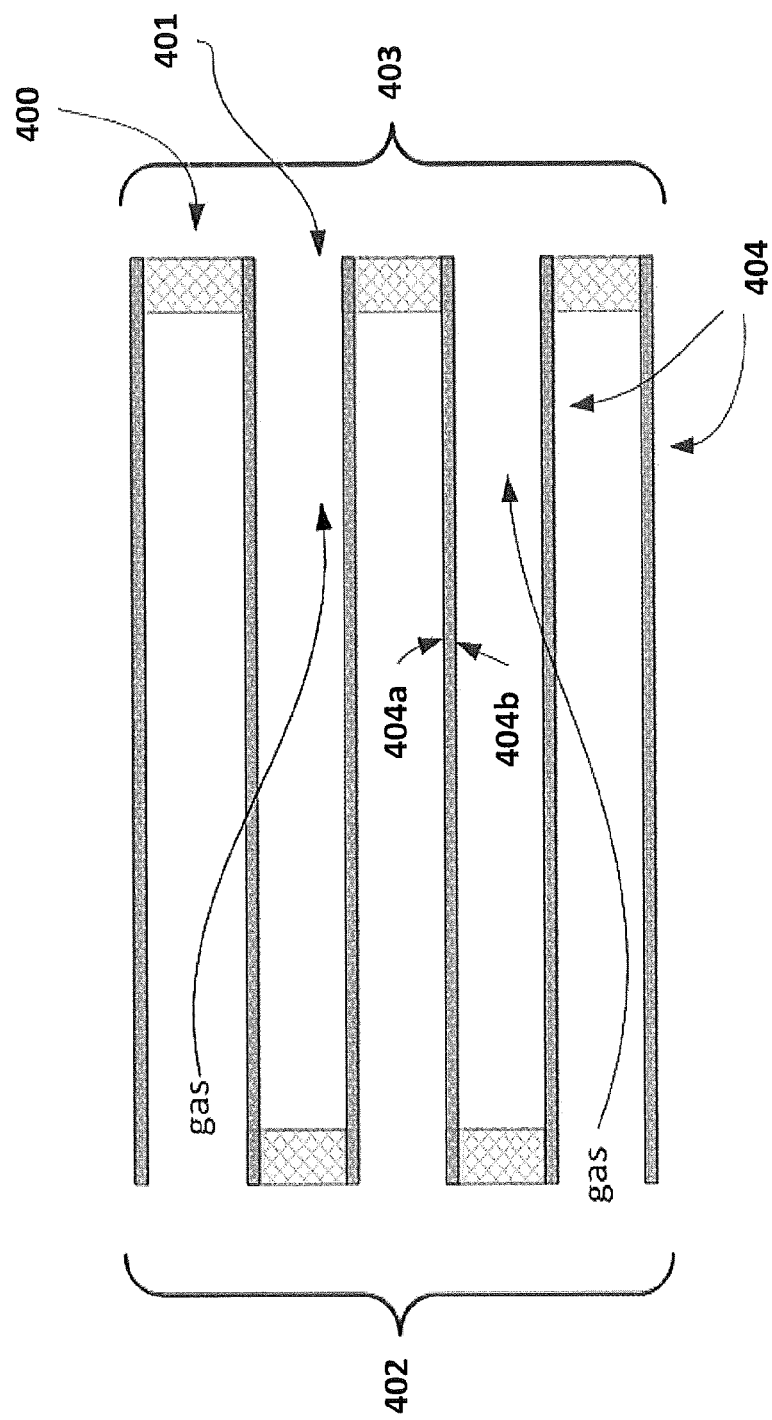

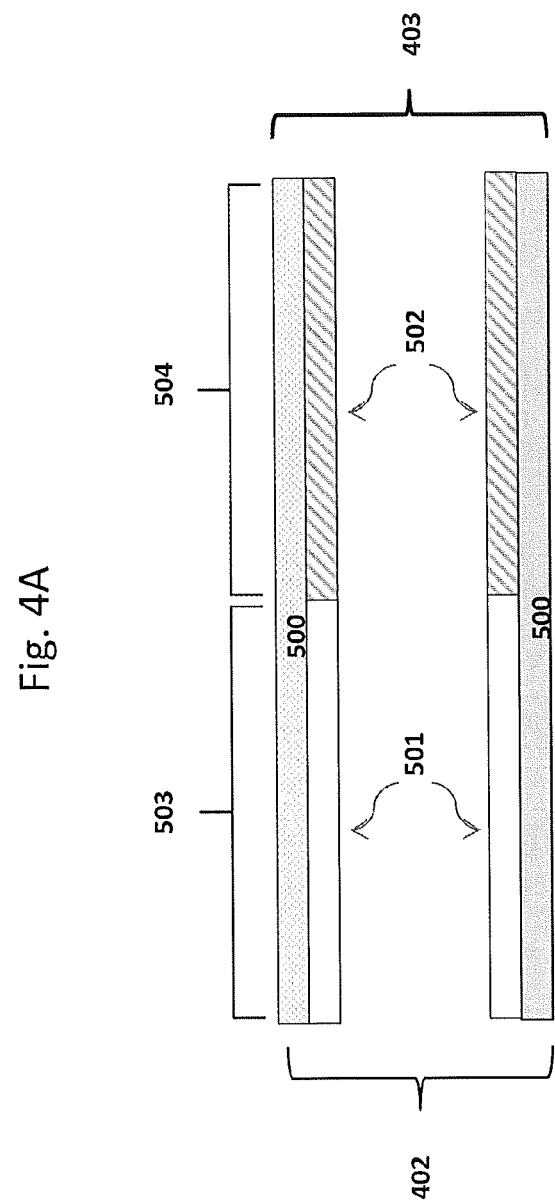

ON-BOARD VEHICLE HYDROGEN GENERATION AND USE IN EXHAUST STREAMS

CROSS-REFERENCE TO RELATED APPLICATIONS

This application is a continuation of International Application No. PCT/IB2018/052299; filed Apr. 3, 2018, which International Application was published by the International Bureau in English on Oct. 11, 2018, and which claims priority to U.S. Provisional Application No. 62/481,230, filed on Apr. 4, 2017, the content of each of which is hereby incorporated by reference in its entirety.

FIELD OF THE INVENTION

The invention is aimed at systems, articles and methods for on-board vehicle hydrogen generation and use of hydrogen as a reductant in an exhaust gas stream of an internal combustion engine.

BACKGROUND OF THE INVENTION

Environmental regulations for emissions of internal combustion engines are becoming increasingly stringent throughout the world.

Operation of lean-burn engines, for example diesel engines, provides the user with excellent fuel economy due to their operation at high air/fuel ratios under fuel lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. The two major components of exhaust particulate matter are the soluble organic fraction (SOF) and the soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising a precious metal, such as platinum group metals (PGMs), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain PGM promote the oxidation of NO to $NO_2$. Catalysts are typically defined by their light-off temperature or the temperature at which 50% conversion is attained, also called $T_{50}$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include a sorbent material, which may be a zeolite, as part of a catalytic treatment system in order to adsorb and/or absorb gaseous pollutants, usually hydrocarbons, and retain them during the initial cold-start period. As the exhaust gas temperature increases, the stored hydrocarbons are driven from the sorbent and subjected to catalytic treatment at the higher temperature.

$NO_x$ is contained in exhaust gases, such as from internal combustion engines (e.g., in automobiles and trucks), from combustion installations (e.g., power stations heated by natural gas, oil, or coal), and from nitric acid production plants. Various treatment methods have been used for the treatment of $NO_x$-containing gas mixtures to decrease atmospheric pollution.

One effective method to reduce NO from the exhaust of lean-burn engines, such as gasoline direct injection and partial lean-burn engines, as well as from diesel engines, requires trapping and storing of NO under lean burn engine operating conditions and reducing the trapped NO under stoichiometric or rich engine operating conditions or under lean engine operation with external fuel injected in the exhaust to induce rich conditions. The lean operating cycle is typically between 1 minute and 20 minutes and the rich operating cycle is typically short (1 to 10 seconds) to preserve as much fuel as possible. To enhance NO conversion efficiency, the short and frequent regeneration is favored over long but less frequent regeneration. Thus, a lean $NO_x$ trap catalyst generally must provide a $NO_x$ trapping function and a three-way conversion function.

Some lean $NO_x$ trap (LNT) systems contain alkaline earth elements. For example, $NO_x$ sorbent components include alkaline earth metal oxides, such as oxides of Mg, Ca, Sr or Ba. Other lean LNT systems can contain rare earth metal oxides such as oxides of Ce, La, Pr or Nd. The $NO_x$ sorbents can be used in combination with platinum group metal catalysts, such as platinum dispersed on an alumina support, for catalytic $NO_x$ oxidation and reduction. The LNT catalyst operates under cyclic lean (trapping mode) and rich (regeneration mode) exhaust conditions during which the engine out NO is converted to $N_2$.

Another effective method to reduce $NO_x$ from the exhaust of lean-burn engines requires reaction of $NO_x$ under lean burn engine operating conditions with a suitable reductant such as ammonia or hydrocarbon in the presence of a selective catalytic reduction (SCR) catalyst. The SCR process uses catalytic reduction of nitrogen oxides with a reductant (e.g., ammonia) in the presence of atmospheric oxygen, resulting in the formation predominantly of nitrogen and steam:

$$4NO + 4NH_3 + O_2 \rightarrow 4N_2 + 6H_2O \quad \text{(standard SCR reaction)}$$

$$2NO_2 + 4NH_3 \rightarrow 3N_2 + 6H_2O \quad \text{(slow SCR reaction)}$$

$$NO + NO_2 + NH_3 \rightarrow 2N_2 + 3H_2O \quad \text{(fast SCR reaction)}$$

Current catalysts employed in the SCR process include molecular sieves, such as zeolites, ion-exchanged with a catalytic metal such as iron or copper.

A useful SCR catalyst component is able to effectively catalyze the reduction of the NOx exhaust component at temperatures below 600° C., so that reduced $NO_x$ levels can be achieved even under conditions of low load which typically are associated with lower exhaust temperatures.

Increasingly stringent emissions regulations have driven the need for developing exhaust gas treatment systems with improved CO, HC and NO oxidation capacity to manage CO, HC, and NO emissions at low engine exhaust temperatures. In addition, development of exhaust gas treatment systems for the reduction of $NO_x$ (NO and $NO_2$) emissions to nitrogen has become increasingly important. Further, it is observed that precious metals (which are commonly used in such systems) tend to agglomerate and form charged particles under operating conditions, resulting in loss of catalytic activity. It would be beneficial to provide further materials and methods to remove undesirable exhaust gas components such as CO, HC, and/or $NO_x$.

SUMMARY OF THE INVENTION

The present invention provides on-board vehicle hydrogen generation, storage and use as a reductant in exhaust gas streams of internal combustion engines. Generated hydrogen may serve to aid oxidation of CO and/or HC and/or NO in an exhaust gas stream. A hydrogen reductant is, for example, suitable to regenerate precious metals, for instance precious metals present in a diesel oxidation catalyst (DOC).

The disclosure provides a vehicle on-board system configured to generate hydrogen and to introduce (e.g., inject or release) the generated hydrogen into an exhaust gas stream of an internal combustion engine. The disclosure also provides a method for on-board vehicle generation of hydrogen, the method comprising splitting water into hydrogen and oxygen in a water-splitting article.

Accordingly, in one aspect is provided a vehicle on-board system configured to generate hydrogen and to introduce the generated hydrogen into an exhaust gas stream of an internal combustion engine, the system comprising a water-splitting article configured to split water into hydrogen and oxygen and a hydrogen injection article configured to inject or release the generated hydrogen into the exhaust gas stream.

In some embodiments, the system further comprises a water collection article configured to collect and/or store water, wherein the water collection article is associated with the water-splitting article. In some embodiments, the system further comprises a condenser configured to condense atmospheric water, wherein the water collection article is configured to collect and/or store the condensed atmospheric water.

In some embodiments, the water-splitting article comprises an electrolytic cell. In some embodiments, the water-splitting article comprises a photochemical cell. In some embodiments, the system further comprises a battery associated with the water-splitting article.

In some embodiments, the system further comprises a heating article associated with the water collection article and the water-splitting article, the heating article configured to convert collected and/or stored water to steam. In some embodiments, the water-splitting article is configured to split steam into hydrogen and oxygen.

In some embodiments, the system further comprises a hydrogen collection article configured to collect hydrogen, wherein the hydrogen collection article is associated with the water-splitting article. In some embodiments, the system further comprises a hydrogen storage article associated with the hydrogen collection article and configured to store hydrogen.

In some embodiments, the hydrogen injection article is downstream of and in fluid communication with an internal combustion engine and with an oxidation catalyst, and is configured to introduce hydrogen intermittently on-demand upstream of the oxidation catalyst. In some embodiments, the system is integrated with a vehicle electronic management system. In some embodiments, the system is configured to introduce hydrogen into an exhaust gas stream with a temperature of ≤150° C.

In another aspect is provided a vehicle on-board system configured to generate hydrogen and to introduce the generated hydrogen into an exhaust gas stream of an internal combustion engine, the vehicle on-board system comprising a water collection article configured to collect and/or store water, a water-splitting article associated with the water collection article and configured to split water into hydrogen and oxygen, a hydrogen collection article associated with the water-splitting article and configured to collect hydrogen, a hydrogen storage article associated with the hydrogen collection article and configured to store hydrogen, and a hydrogen injection article associated with the hydrogen storage article and configured to introduce stored hydrogen into an exhaust gas stream of an internal combustion engine on-demand.

In some embodiments, the system is integrated with a vehicle electronic management system.

In some embodiments, the system is configured to introduce hydrogen into an exhaust gas stream with a temperature of ≤150° C.

In yet another aspect is provided a vehicle comprising the system for on-board vehicle generation of hydrogen as described herein.

In a further aspect is provided a method for on-board vehicle generation of hydrogen, the method comprising splitting water into hydrogen and oxygen in a water-splitting article.

In some embodiments, the method further comprises collecting water from the atmosphere with a condenser and routing the water to the water-splitting article. In some embodiments, the method comprises splitting water into hydrogen and oxygen electrochemically in an electrolytic cell. In some embodiments, the method further comprises heating water to form steam and routing the steam to the water-splitting article, wherein the water-splitting article is configured to split steam into hydrogen and oxygen; collecting hydrogen; and, optionally, storing the hydrogen in a hydrogen storage article.

In some embodiments, the method further comprises introducing hydrogen into an exhaust gas stream of an internal combustion engine. In some embodiments, the method further comprises introducing hydrogen into an exhaust gas stream of an internal combustion engine upon instructions from a vehicle electronic management system.

In yet another aspect is provided a method for on-board vehicle generation of hydrogen, the method comprising collecting water with a water collection article configured to collect and/or store water, splitting water with a water-splitting article associated with the water collection article and configured to split water into hydrogen and oxygen, collecting hydrogen with a hydrogen collection article associated with the water-splitting article and configured to collect hydrogen, storing hydrogen with a hydrogen storage article associated with the hydrogen collection article and configured to store hydrogen, and introducing the stored hydrogen into an exhaust gas stream of an internal combustion engine with a hydrogen injection article associated with the hydrogen storage article and configured to introduce stored hydrogen into the exhaust gas stream of an internal combustion engine.

In some embodiments, the method further comprises introducing hydrogen into an exhaust gas stream of an internal combustion engine upon instructions from a vehicle electronic management system.

The present disclosure includes, without limitation, the following embodiments:

Embodiment 1: A vehicle on-board system configured to generate hydrogen and to introduce the generated hydrogen into an exhaust gas stream of an internal combustion engine, the vehicle on-board system comprising a water-splitting article configured to split water into hydrogen and oxygen and a hydrogen injection article configured to introduce the generated hydrogen into the exhaust gas stream.

Embodiment 2: The system of the preceding embodiment, further comprising a water collection article configured to collect and/or store water, wherein the water collection article is associated with the water-splitting article.

Embodiment 3: The system of the preceding embodiment, wherein the water collection article is configured to collect and/or store condensed atmospheric water.

Embodiment 4: The system of any preceding embodiment, wherein the water collection article is associated with a condenser.

Embodiment 5: The system of any preceding embodiment, wherein the water-splitting article comprises an electrolytic cell.

Embodiment 6: The system of any preceding embodiment, wherein the water-splitting article comprises a photochemical cell.

Embodiment 7: The system of any preceding embodiment, wherein the photochemical cell comprises a light emitting diode.

Embodiment 8: The system of any preceding embodiment, wherein the light emitting diode emits blue light.

Embodiment 9: The system of any preceding embodiment, wherein the photochemical cell comprises a photocatalyst.

Embodiment 10: The system of any preceding embodiment, further comprising a battery.

Embodiment 11: The system of any preceding embodiment, wherein the battery is associated with the water-splitting article.

Embodiment 12: The system of any preceding embodiment, wherein the photochemical cell is associated with a battery.

Embodiment 13: The system of any preceding embodiment, wherein the battery is a rechargeable battery.

Embodiment 14: The system of any preceding embodiment, further comprising a heating article.

Embodiment 15: The system of any preceding embodiment, wherein the heating article is associated with the water collection article and the water-splitting article.

Embodiment 16: The system of any preceding embodiment, wherein the heating article is configured to convert collected and/or stored water to steam.

Embodiment 17: The system of any preceding embodiment, wherein the water-splitting article is configured to split the steam into hydrogen and oxygen.

Embodiment 18: The system of any preceding embodiment, further comprising a hydrogen collection article configured to collect hydrogen, and wherein the hydrogen collection article is associated with the water-splitting article.

Embodiment 19: The system of any preceding embodiment, wherein the hydrogen collection article comprises a hydrogen separation membrane.

Embodiment 20: The system of any preceding embodiment, wherein the hydrogen separation membrane comprises palladium.

Embodiment 21: The system of any preceding embodiment, wherein the membrane is ≤1.0 mm thick.

Embodiment 22: The system of any preceding embodiment, wherein the membrane is from about 0.001 mm to about 1 mm thick.

Embodiment 23: The system of any preceding embodiment, wherein the membrane is from about 0.001 mm, from about 0.01 or from about 0.1 mm thick to about 0.2, about 0.5 or about 1 mm thick.

Embodiment 24: The system of any preceding embodiment, wherein the membrane is supported with a perforated stainless steel sheet or ceramic sheet.

Embodiment 25: The system of any preceding embodiment, wherein the stainless steel or ceramic sheet is from about 0.25 mm thick to about 1.5 mm thick.

Embodiment 26: The system of any preceding embodiment, wherein the stainless steel or ceramic sheet is about 1 mm thick.

Embodiment 27: The system of any preceding embodiment, further comprising a hydrogen storage article configured to store hydrogen and associated with the hydrogen collection article.

Embodiment 28: The system any preceding embodiment, wherein the hydrogen storage article is configured to store gaseous hydrogen.

Embodiment 29: The system of any preceding embodiment, wherein the hydrogen storage article comprises a hydrogen storage alloy.

Embodiment 30: The system of any preceding embodiment, wherein the hydrogen injection article is configured to introduce hydrogen intermittently on-demand into the exhaust gas stream.

Embodiment 31: The system of any preceding embodiment, wherein the hydrogen injection article is associated with a hydrogen storage article and is configured to introduce stored hydrogen into the exhaust gas stream.

Embodiment 32: The system of any preceding embodiment, wherein the hydrogen injection article comprises a check valve.

Embodiment 33: The system of any preceding embodiment, wherein the hydrogen injection article is in fluid communication with an oxidation catalyst and is configured to introduce hydrogen upstream of the oxidation catalyst.

Embodiment 34: The system of any preceding embodiment, wherein the oxidation catalyst is a diesel oxidation catalyst (DOC).

Embodiment 35: The system of any preceding embodiment, wherein the hydrogen injection article is downstream of and in fluid communication with an internal combustion engine.

Embodiment 36: A vehicle on-board system configured to generate hydrogen and to introduce the generated hydrogen into an exhaust gas stream of an internal combustion engine, the vehicle on-board system comprising a water collection article configured to collect and/or store water, a water-splitting article associated with the water collection article and configured to split water into hydrogen and oxygen, a hydrogen collection article associated with the water-splitting article and configured to collect hydrogen, a hydrogen storage article associated with the hydrogen collection article and configured to store hydrogen, and a hydrogen injection article associated with the hydrogen storage article and configured to introduce stored hydrogen into an exhaust gas stream of an internal combustion engine on-demand.

Embodiment 37: The system of any preceding embodiment, wherein the system is integrated with a vehicle electronic management system.

Embodiment 38: The system of any preceding embodiment, configured to introduce hydrogen into an exhaust gas stream with a temperature of ≤150° C.

Embodiment 39: The system of any preceding embodiment, wherein the temperature of the exhaust gas stream is from about 0° C. to about 150° C.

Embodiment 40: The system of any preceding embodiment, wherein the temperature of the exhaust gas stream is about 0° C., about 10° C., about 20° C., about 30° C., about 40° C., about 50° C., about 60° C., about 70° C., about 80° C., about 90° C., about 100° C., about 110° C., about 120° C., about 130° C., about 140° C. or about 150° C.

Embodiment 41: A vehicle comprising the system of any preceding embodiment.

Embodiment 42: The vehicle of the preceding embodiment, further comprising a condenser adapted to condense atmospheric water.

Embodiment 43: The vehicle of any preceding embodiment, further comprising a diesel oxidation catalyst.

Embodiment 44: A method for on-board vehicle generation of hydrogen, the method comprising splitting water into hydrogen and oxygen in a water-splitting article.

Embodiment 45: The method of any preceding embodiment, further comprising collecting water and routing the water to the water-splitting article.

Embodiment 46: The method of any preceding embodiment, further comprising collecting water from the atmosphere.

Embodiment 47: The method of any preceding embodiment, comprising collecting water from the atmosphere with a condenser.

Embodiment 48: The method of any preceding embodiment, comprising splitting water into hydrogen and oxygen electrochemically in an electrolytic cell.

Embodiment 49: The method of any preceding embodiment, wherein the electrolytic cell comprises a photoelectrode.

Embodiment 50: The method of any preceding embodiment, wherein the photoelectrode comprises a light emitting diode.

Embodiment 51: The method of any preceding embodiment, wherein the light emitting diode emits blue light.

Embodiment 52: The method of any preceding embodiment, wherein the water-splitting article is associated with a battery.

Embodiment 53: The method of any preceding embodiment, wherein the electrolytic cell is associated with a battery.

Embodiment 54: The method of any preceding embodiment, wherein the photoelectrode is associated with a battery.

Embodiment 55: The method of any preceding embodiment, wherein the battery is a rechargeable battery.

Embodiment 56: The method of any preceding embodiment, comprising collecting water, heating the water and routing the heated water to the water-splitting article.

Embodiment 57: The method of any preceding embodiment, comprising heating the water to form steam and routing the steam to the water-splitting article.

Embodiment 58: The method of any preceding embodiment, wherein the water-splitting article is configured to split steam into hydrogen and oxygen.

Embodiment 59: The method of any preceding embodiment, further comprising collecting the hydrogen.

Embodiment 60: The method of any preceding embodiment, comprising collecting the hydrogen with a hydrogen separation membrane.

Embodiment 61: The method of any preceding embodiment, wherein the hydrogen separation membrane comprises palladium.

Embodiment 62: The method of any preceding embodiment, wherein the membrane is ≤0.10 mm thick.

Embodiment 63: The method of any preceding embodiment, wherein the membrane is supported with a perforated stainless steel sheet or ceramic sheet.

Embodiment 64: The method of any preceding embodiment, wherein the stainless steel or ceramic sheet is from about 0.25 mm thick to about 1.5 mm thick.

Embodiment 65: The method of any preceding embodiment, wherein the stainless steel or ceramic sheet is about 1 mm thick.

Embodiment 66: The method of any preceding embodiment, further comprising storing hydrogen in a hydrogen storage article.

Embodiment 67: The method of any preceding embodiment, comprising storing gaseous hydrogen.

Embodiment 68: The method of any preceding embodiment, comprising storing hydrogen in a solid state.

Embodiment 69: The method of any preceding embodiment, comprising storing hydrogen in silicon or a hydrogen storage alloy.

Embodiment 70: The method of any preceding embodiment, further comprising introducing hydrogen into an exhaust gas stream of an internal combustion engine.

Embodiment 71: The method of any preceding embodiment, comprising introducing hydrogen intermittently on-demand into an exhaust gas stream.

Embodiment 72: The method of any preceding embodiment, comprising introducing the hydrogen with a check valve into an exhaust gas stream.

Embodiment 73: The method of any preceding embodiment, comprising introducing hydrogen upstream of an oxidation catalyst.

Embodiment 74: The method of any preceding embodiment, wherein the oxidation catalyst is a diesel oxidation catalyst (DOC).

Embodiment 75: The method of any preceding embodiment, comprising introducing hydrogen into an exhaust gas stream downstream of an internal combustion engine.

Embodiment 76: A method for on-board vehicle generation of hydrogen, the method comprising collecting water with a water collection article configured to collect and/or store water, splitting the water with a water-splitting article associated with the water collection article and configured to split water into hydrogen and oxygen, collecting the hydrogen with a hydrogen collection article associated with the water-splitting article and configured to collect hydrogen, storing the hydrogen with a hydrogen storage article associated with the hydrogen collection article and configured to store hydrogen, and introducing the stored hydrogen into an exhaust gas stream of an internal combustion engine with a hydrogen injection article associated with the hydrogen storage article and configured to inject or release stored hydrogen into the exhaust gas stream of an internal combustion engine.

Embodiment 77: The method of any preceding embodiment, comprising introducing hydrogen into an exhaust gas stream intermittently on-demand.

Embodiment 78: The method of any preceding embodiment, comprising introducing hydrogen into an exhaust gas stream with a temperature of ≤150° C.

Embodiment 79: The method of any preceding embodiment, comprising introducing hydrogen into an exhaust gas stream with a temperature from about 0° C. to about 150° C.

Embodiment 80: The method of any preceding embodiment, comprising introducing hydrogen into an exhaust stream at a temperature of about 0° C., about 10° C., about 20° C., about 30° C., about 40° C., about 50° C., about 60° C., about 70° C. or about 80° C. to about 90° C., about 100° C., about 110° C., about 120° C., about 130° C., about 140° C. or about 150° C.

Embodiment 81: The method of any preceding embodiment, further comprising generating hydrogen upon instructions from a vehicle electronic management system.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

Some of the disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 3 is a cross-sectional view of a section of a wall-flow filter substrate;

FIGS. 4A, 4B and 4C illustrate various coating configurations on the walls of a substrate.

DETAILED DESCRIPTION OF THE INVENTION

Figure 1:
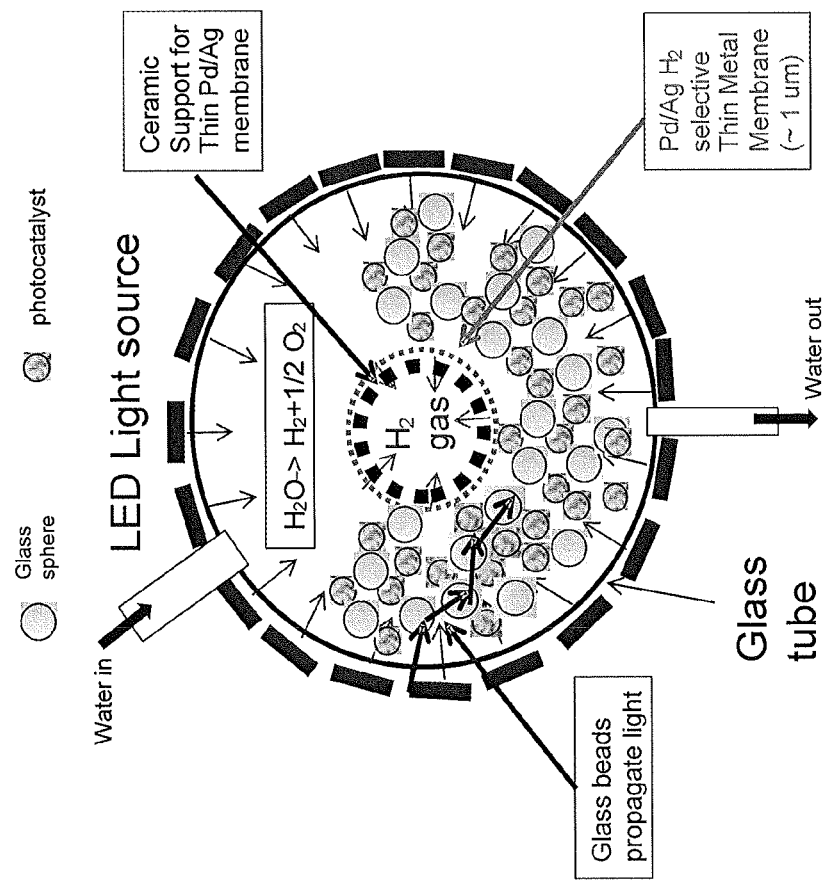
FIG. 1 is a cross-sectional view of a hydrogen-generating photochemical cell.

The present invention provides systems, articles, and methods for on-board vehicle hydrogen generation, storage and use as a reductant in exhaust gas streams of internal combustion engines. Generated hydrogen enhances oxidation of CO and/or HC and/or $NO_x$ in an exhaust gas stream. Hydrogen reductant is, for example, suitable to regenerate precious metals, e.g., precious metals present in a diesel oxidation catalyst (DOC).

Accordingly, the present disclosure provides a vehicle on-board system configured to generate hydrogen and to introduce the generated hydrogen into an exhaust gas stream of an internal combustion engine. The vehicle on-board system comprises a hydrogen generator comprising a water-splitting article configured to split water into hydrogen and oxygen, and a hydrogen injection article configured to introduce the generated hydrogen into the exhaust gas stream. Further provided is an exhaust gas treatment system comprising one or more of a hydrogen generator, a hydrogen injection article, an oxidation catalyst and an internal combustion engine, as disclosed herein.

The disclosure also provides a method for on-board vehicle generation of hydrogen, comprising splitting water into hydrogen and oxygen in a water-splitting article. In some embodiments, the method further comprises introducing the hydrogen into an exhaust gas stream of an internal combustion engine, for example, upstream from an oxidation catalyst.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

The present invention is directed to systems, articles and methods for on-board vehicle hydrogen generation for use as a reductant in an exhaust gas stream of an internal combustion engine. The present systems comprise one or more "functional articles" or simply "articles." The term "functional article" in the invention means an article comprising a substrate having a functional coating composition disposed thereon, in particular a catalyst and/or sorbent coating composition. Functional articles may comprise further functional elements, for instance, reservoirs, tubing, pumps, valves, batteries, circuitry, meters, nozzles, reactors, filters, funnels, and the like.

The term "associated" means, for instance, "equipped with", "connected to" or in "communication with", for example "electrically connected" or "in fluid communication with" or otherwise connected in a way to perform a function. The term "associated" may mean directly associated with or indirectly associated with, for instance through one or more other articles or elements. The term "associated with" means, for example, equipped with, interconnected with, connected to, in fluid communication with, in electrical communication with, and the like. The term "associated with" provides for an integrated system. Connection or communication may be directly or indirectly. The present system is integrated, that is, having interconnected articles and/or elements.

The term "catalyst" refers to a material that promotes a chemical reaction. The catalyst includes the "catalytically active species" and the "carrier" that carries or supports the active species. For example, molecular sieves including zeolites are carriers/supports for copper active catalytic species. Likewise, refractory metal oxide particles may be a carrier for platinum group metal catalytic species.

The catalytically active species are also termed "promoters" as they promote chemical reactions. For instance, the present copper- or iron-containing molecular sieves may be termed copper- or iron-promoted molecular sieves. A "promoted molecular sieve" refers to a molecular sieve to which catalytically active species are intentionally added.

The term "catalytic article" in the invention means an article comprising a substrate having a catalyst coating composition.

The term "configured" as used in the description and claims is intended to be an open-ended term as are the terms "comprising" or "containing". The term "configured" is not meant to exclude other possible articles or elements. The term "configured" may be equivalent to "adapted".

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen.

"Platinum group metal components" refer to platinum group metals or one of their oxides.

As used herein, the term "promoted" refers to a component that is intentionally added to, e.g., a molecular sieve material, typically through ion exchange, as opposed to impurities inherent in the molecular sieve. A molecular sieve may, for example, be promoted with copper (Cu) and/or iron (Fe), although other catalytic metals could be used, such as manganese, cobalt, nickel, cerium, platinum, palladium, rhodium or combinations thereof.

"Rare earth metal components" refer to one or more oxides of the lanthanum series defined in the Periodic Table of Elements, including lanthanum, cerium, praseodymium and neodymium.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen.

The term "sorbent" refers to a material that adsorbs and/or absorbs a desired substance, in this invention $NO_x$ and/or CO and/or HC and/or $NH_3$. Sorbents may advantageously adsorb and/or absorb (store) a substance at a certain temperature and desorb (release) the substance at a higher temperature.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. A washcoat is formed by preparing a slurry containing a specified solids content (e.g., 30-90% by weight) of catalyst in a liquid, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. The washcoat containing the metal-promoted molecular sieve of the invention can optionally comprise a binder selected from silica, alumina, titania, zirconia, ceria, or a combination thereof. The loading of the binder is about 0.1 to 10 wt. % based on the weight of the washcoat.

The term "vehicle" means, for instance, any vehicle having an internal combustion engine and includes for instance passenger automobiles, sport utility vehicles, minivans, vans, trucks, buses, refuse vehicles, freight trucks, construction vehicles, heavy equipment, military vehicles, farm vehicles and the like.

Unless otherwise indicated, all parts and percentages are by weight. "Weight percent (wt. %)," if not otherwise indicated, is based on an entire composition free of any volatiles, that is, based on dry solids content.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Hydrogen Generation System

The hydrogen generation system of the present disclosure may comprise a water-splitting functional article (water-splitting article). The water-splitting article may comprise any of a number of different articles. It may comprise an electrolytic cell configured to split water into hydrogen and oxygen via an electrochemical reaction. For instance, the water-splitting article may comprise an electrode configured to initiate the electrochemical reaction.

Devices for hydrogen generation are disclosed for example in U.S. Pat. No. 8,475,722 and U.S. Patent Application Pub. Nos. 2007/0246351 and 2008/0257751, each of which is incorporated herein by reference.

A water-splitting article may comprise a photochemical cell comprising an internal light source, a photocatalyst adapted to split water into hydrogen and oxygen upon exposure to light, circulating water, a light scattering material dispersed within the cell and a membrane adapted separate hydrogen from oxygen. Advantageously, the light source in some embodiments is a light emitting diode (LED), for example, a blue light emitting diode.

The light source may be adapted to emit light for example from ultraviolet (UV) light to visible light to near infrared (IR) light, for example from about 270 nm or about 700 nm to about 2000 nm. Advantageously, the light source may be a compact GaN LED emitting in the blue wavelength region of from about 420 nm to about 470 nm. The choice of light source may depend on the photocatalyst.

The light source will advantageously be associated with a battery. The battery is, for example, the main rechargeable vehicle battery.

The water source may advantageously be atmospheric water. For instance, the water source may be atmospheric water condensed by a condenser. A condenser may be a condenser that is part of an air-conditioning system or may be a separate stand-alone condenser. The present system may therefore comprise an article configured to collect and/or store water (a water collection article). The water collection article may be associated with a condenser. The water source may also be for example bottled water. The water source may also be collected rain water. The water collection article may be associated with a filter.

The water may be supplied to the water-splitting article in the form of steam. The water may be heated to steam via captured heat generated by the internal combustion engine. Thus the system may comprise a heating article configured to convert water to steam. The heating article may be associated with an internal combustion engine or exhaust gas stream.

Photocatalysts capable of splitting water into hydrogen and oxygen are known. Examples include, but are not limited to, metal oxides and sulfides including $TiO_2$, $WO_3$, $SrTiO_3$, ZnO, CdS, ZnS, niobates and tantalates. Other certain photocatalysts include $Ni_3S_2$/CdS, $NiO/NaTaO_2$/La and $NiO/KNbO_3$/CdS.

The photochemical cell advantageously contains a light scattering medium to efficiently distribute light throughout the cell. Suitable light scattering media include, for example, glass beads. Particulate photocatalysts may be mixed with glass beads or glass beads may be coated with photocatalysts.

Generated hydrogen may be collected via a hydrogen collection article. For example, a hydrogen collection article may comprise a hydrogen separation membrane in a cylindrical or tube form extending through the photochemical cell. The membrane may be one of several tubes designed to optimize isolation of hydrogen from the cell. Hydrogen separation membranes may comprise palladium or palladium alloys and may, for instance, be ≤1.0 mm thick. Hydrogen separation membranes may also comprise for example polymer, silica, ceramic or porous carbon. For example, in certain non-limiting embodiments, the membrane is ≤0.1 mm thick, for example the membrane is from about 0.001 mm, from about 0.01 or from about 0.1 mm thick to about 0.2, about 0.5 or about 1 mm thick. The membrane may be supported with a perforated stainless steel sheet, for instance about 1 mm thick. Alternatively, the membrane may be supported on a porous ceramic tube or rod. The membrane may be associated with a heating element, e.g. an electrical heating element, to maximize the flow of hydrogen and separation from oxygen.

Oxygen may be collected and employed for instance as an oxidant if desired or may be vented to the atmosphere. The oxygen may be mixed with circulating water and vented out.

A cross-section of a possible photochemical cell is shown in FIG. 1. The cell is cylinder-shaped and is configured to have circulating water via in and out adapters. Water may be liquid or steam. The illustrated cell is configured with an LED light source, a glass tube, glass beads, particulate photocatalyst and a hydrogen separation membrane supported with ceramic support.

Collected hydrogen may be stored in a hydrogen storage article, for example stored in a gas storage tank or reservoir. Collected hydrogen may be stored in a gaseous, liquid or solid state. Generated hydrogen may be stored for instance in a solid state, for example in silicon or a hydrogen storage alloy. Solid state hydrogen storage is taught for example in U.S. Pub. Nos. 2004/0241507, 2008/0003470, 2008/0274873, 2010/0024542 and 2011/0236790, each of which is incorporated herein by reference. Hydrogen storage alloys reversibly store hydrogen and are disclosed, for example, in U.S. Pat. Nos. 5,407,761 and 6,193,929 and U.S. Pub. No. 2016/0230255, each of which is incorporated herein by reference. Hydrogen storage alloys are, for example, modified $AB_x$ type metal hydride (MH) alloys where in general, A is a hydride forming element and B is a weak or non-hydride forming element. A is, in general, a larger metallic atom with 4 or less valence electrons and B is, in general, a smaller metallic atom with 5 or more valence electrons. Suitable $AB_x$ alloys include those where x is from about 0.5 to about 5. The present alloys are capable of reversibly absorbing (charging) and desorbing (discharging) hydrogen. $AB_x$ type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$) and $AB_5$ ($LaNi_5$, $CeNi_5$).

Oxidation Catalyst Articles
Oxidation Catalyst Compositions

As mentioned, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust.

In a method of the present invention, hydrogen is pulsed into an exhaust gas stream upstream of an oxidation catalyst composition, for example a diesel oxidation catalyst (DOC), during a cold-start period (≤150° C.). Hydrogen serves to enhance low temperature oxidation of NO and/or CO and/or HC pollutants.

The oxidation catalyst, such as a DOC, is suitable for example to oxidize NO and/or CO and/or HC components of exhaust gas. Suitable oxidation catalysts advantageously comprise a platinum group metal (PGM) dispersed on a refractory metal oxide support.

Oxidation catalysts comprising a precious metal, such as a platinum group metal (PGM), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in DOCs, which are placed in the exhaust flow path from diesel engines to treat the exhaust before it vents to the atmosphere. Typically, the diesel oxidation catalysts are formed on ceramic or metallic substrates upon which one or more catalyst coating compositions are deposited.

The oxidation catalyst composition may comprise a PGM component from about 0.1 wt. % (weight percent), about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry composition.

The support material on which the catalytically active PGM is deposited, for example, comprises a refractory metal oxide, which exhibits chemical and physical stability at high temperatures, such as the temperatures associated with gasoline or diesel engine exhaust. Exemplary refractory metal oxides include alumina, silica, zirconia, titania, ceria, praseodymia, tin oxide and the like, as well as physical mixtures or chemical combinations thereof, including atomically-doped combinations and including high surface area or activated compounds such as activated alumina.

Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina and alumina-ceria. Exemplary aluminas include large pore boehmite, gamma-alumina and delta/theta alumina. Useful commercial aluminas used as refractory metal oxide supports include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 m$^2$/g, often up to about 200 m$^2$/g or higher. An exemplary refractory metal oxide comprises high surface area γ-alumina having a specific surface area of about 50 to about 300 m$^2$/g. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by N$_2$ adsorption. Desirably, the active alumina has a specific surface area of about 60 to about 350 m$^2$/g, for example from about 90 to about 250 m$^2$/g.

In certain embodiments, metal oxide supports useful in the catalyst compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-10% $SiO_2$—$TiO_2$) or doped zirconia materials, such as Si-doped $ZrO_2$ (including, but not limited to 5-30% $SiO_2$—$ZrO_2$).

Advantageously, a refractory metal oxide may be doped with one or more additional basic metal oxide materials such as lanthanum oxide, barium oxide, strontium oxide, calcium oxide, magnesium oxide or combinations thereof. The metal oxide dopant is typically present in an amount of about 1 to about 20% by weight, based on the weight of the catalyst composition. The dopant oxide materials may serve to improve the high temperature stability of the refractory metal oxide support or function as a sorbent for acidic gases such as $NO_2$, $SO_2$ or $SO_3$.

The dopant metal oxides can be introduced using an incipient wetness impregnation technique or by addition of colloidal mixed oxide particles. Preferred doped metal oxides include baria-alumina, baria-zirconia, baria-titania, baria-zirconia-alumina, lanthana-zirconia and the like.

Thus, the refractory metal oxides (including refractory mixed metal oxides) in the catalyst compositions are typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof. Further doping with basic metal oxides provides additional useful refractory oxide supports including but not limited to baria-alumina, baria-zirconia, baria-titania, baria-zirconia-alumina, lanthana-zirconia and the like.

The oxidation catalyst composition may comprise any one or more of the above named refractory metal oxides and in any amount. For example refractory metal oxides in the catalyst composition may comprise at least about 15 wt. %, at least about 20 wt. %, at least about 25 wt. %, at least about 30 wt. % or at least about 35 wt. % (weight percent) alumina where the wt. % is based on the total dry weight of the catalyst composition. The catalyst composition may, for example, comprise from about 10 to about 99 wt. % alumina, from about 15 to about 95 wt. % alumina or from about 20 to about 85 wt. % alumina. The oxidation catalyst composition comprises, for example, from about 15 wt. %, about 20 wt. %, about 25 wt. %, about 30 wt. % or about 35 wt. % to about 50 wt. %, about 55 wt. %, about 60 wt. % about 65 wt. % or about 70 wt. % alumina based on the weight of the catalytic composition. Advantageously, the oxidation catalyst composition may comprise ceria, alumina and zirconia or doped compositions thereof.

The oxidation catalyst composition, in addition to the refractory metal oxide support and catalytically active metal, may further comprise any one or combinations of the oxides of lanthanum, barium, praseodymium, neodymium, samarium, strontium, calcium, magnesium, niobium, hafnium, gadolinium, terbium, dysprosium, erbium, ytterbium, manganese, iron, chromium, tin, zinc, nickel, cobalt or copper.

Catalyst compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica.

The oxidation catalyst composition as described herein may be coated on a substrate. The coatings are "catalytic coating compositions" or "catalytic coatings." A "catalyst composition" and a "catalytic coating composition" are synonymous.

Oxidation Catalyst Substrates

The present substrates are three-dimensional having a length and a diameter and a volume, similar to a cylinder. The shape does not necessarily have to conform to a cylinder. The length is an axial length defined by an inlet end and an outlet end. The diameter is the largest cross-section length, for example the largest cross-section if the shape does not conform exactly to a cylinder.

In general, the substrates are ceramic or metal having a honeycomb structure. Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel.

In one or more embodiments, the substrate on which the oxidation catalyst composition is disposed is a flow-through monolith or a wall-flow filter.

Flow-through monoliths have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through monolith are thin-walled channels, which can be of any suitable cross-sectional shape and size such as trapezoidal, rectangular, square, sinusoidal, hexagonal, oval, circular, etc. The flow-through monolith is ceramic or metallic as described above.

Flow-through monoliths for example have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Figure 2B:
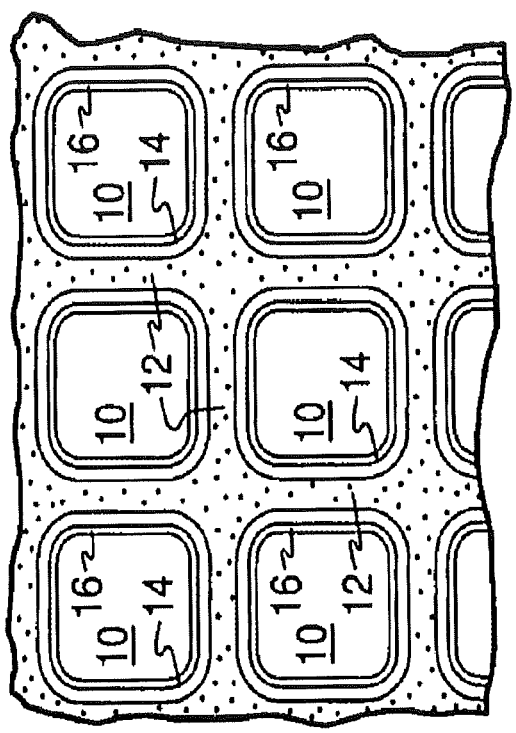
FIG. 2B is a partial cross-sectional view enlarged relative to FIG. 2A and taken along a plane parallel to the end faces of the carrier of FIG. 2A, which shows an enlarged view of a plurality of the gas flow passages shown in FIG. 2A.
Figure 2A:
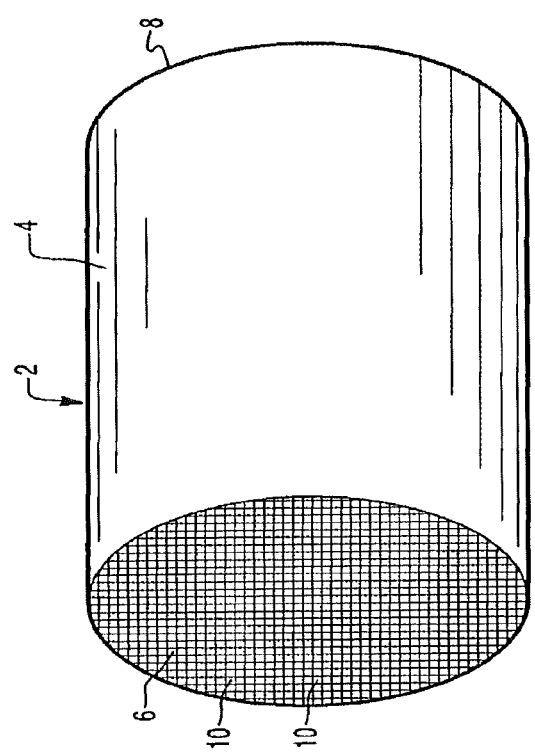
FIG. 2A is a perspective view of a honeycomb-type substrate which may comprise a catalyst composition.

FIGS. 2A and 2B illustrate an exemplary substrate 2 in the form of a flow-through monolith coated with a catalyst composition as described herein. Referring to FIG. 2A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 2B.

Useful wall-flow filter substrates have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 700 or more flow passages (or "cells") per square inch of cross-section, although far fewer may be used. For example, the typical carrier usually has from about 100 to about 300, cells per square inch ("cpsi"). The cells can have cross-sections that are rectangular, square, circular, oval, triangular, hexagonal, or are of other polygonal shapes. The wall-flow filter substrate can be made from materials such as cordierite, aluminum titanate, silicon carbide, silicon titanate, metals or metal foams, as disclosed herein above.

A cross-section view of a wall-flow filter section is illustrated in FIG. 3, showing alternating plugged and open passages (cells). Blocked or plugged ends 400 alternate with open passages 401, with each opposing end open and blocked, respectively. The filter has an inlet end 402 and outlet end 403. The arrows crossing porous cell walls 404 represent exhaust gas flow entering the open cell ends, diffusion through the porous cell walls 404 and exiting the open outlet cell ends. Plugged ends 400 prevent gas flow and encourage diffusion through the cell walls. Each cell wall will have an inlet side 404a and outlet side 404b. The passages are enclosed by the cell walls. The dark squares in FIG. 3 are plugged ends 400 and white squares are open ends 401.

Wall-flow filter substrates typically have a wall thickness from about 50 microns to about 500 microns, for example from about 150 microns to about 400 microns. Useful wall-flow filter substrates have high porosity, allowing high loadings of catalyst compositions without excessive backpressure during operation. Wall-flow filters will generally have a wall porosity of at least 40% with an average pore size of at least 10 microns prior to disposition of the catalytic coating. For instance, wall-flow filters will have a wall porosity of from about 50 to about 75% and an average pore size of from about 10 to about 30 microns prior to disposition of a catalytic coating.

The wall-flow filter may have a volume of for instance from about 50 cm$^3$, about 100 cm$^3$, about 200 cm$^3$, about 300 cm$^3$, about 400 cm$^3$, about 500 cm$^3$, about 600 cm$^3$, about 700 cm$^3$, about 800 cm$^3$, about 900 cm$^3$ or about 1000 cm$^3$ to about 1500 cm$^3$, about 2000 cm$^3$, about 2500 cm$^3$, about 3000 cm$^3$, about 3500 cm$^3$, about 4000 cm$^3$, about 4500 cm$^3$ or about 5000 cm$^3$.

The wall-flow filter optionally has a high aspect ratio, which will allow it to be fitted in a close-coupled position close to the engine. This allows for fast heat-up of the catalyst; the exhaust gas will heat up the catalyst to the operating (catalytic) temperature faster than if it were in an under-floor position. Metallic substrates are advantageously employed in a close-coupled position, allowing for fast heat-up.

Coating of Oxidation Catalyst Substrates

Catalyzed wall-flow filters are disclosed, for instance, in U.S. Pat. No. 7,229,597, which is incorporated herein by reference. This reference teaches a method of applying a catalytic coating such that the coating permeates the porous walls, that is, is dispersed throughout the walls. Flow-through and wall-flow substrates are also taught, for example, in WO2016/070090, which is incorporated herein by reference.

Loading of the catalytic coating on a wall-flow substrate will depend on substrate properties such as porosity and wall thickness and typically will be lower than the catalyst loading on a flow-through substrate. The PGM component of the oxidation catalyst composition is, for example, present from about 5 g/ft$^3$, 10 g/ft$^3$, about 15 g/ft$^3$, about 20 g/ft$^3$, about 40 g/ft$^3$ or about 50 g/ft$^3$ to about 70 g/ft$^3$, about 90 g/ft$^3$, about 100 g/ft$^3$, about 120 g/ft$^3$, about 130 g/ft$^3$, about 140 g/ft$^3$, about 150 g/ft$^3$, about 160 g/ft$^3$, about 170 g/ft$^3$, about 180 g/ft$^3$, about 190 g/ft$^3$, about 200 g/ft$^3$, about 210 g/ft$^3$, about 220 g/ft$^3$, about 230 g/ft$^3$, about 240 g/ft$^3$ or about 250 g/ft$^3$, based on the volume of the substrate.

The oxidation catalyst composition coating of a diesel oxidation catalytic (DOC) article is generally applied to the substrate (e.g., a flow-through honeycomb monolith or a wall-flow filter), as a washcoat containing supports having the catalytically active materials thereon. A washcoat is formed by preparing a slurry containing a specified solids content (e.g., about 10 to about 60% by weight) of supports in a liquid vehicle, which is then applied to a substrate and dried and calcined to provide a coating layer. If multiple coating layers are applied, the substrate may be dried and calcined after each layer is applied and/or after the number of desired multiple layers are applied. Binders may also be employed as described herein above.

The catalytic coating that provides the oxidation catalyst composition of a DOC article may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80% or about 90% of the substrate length. Another layer may extend from the outlet end towards the inlet end extending about 10%, about 20%, about 30%, about 40%, about 50%, about 60%, about 70%, about 80% or about 90% of the substrate length. Different coating layers may be adjacent to each other and not overlay each other. Alternatively, different layers may overlay a portion of each other, providing a third "middle" zone. The middle zone may for example extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different catalytic compositions may reside in each separate coating layer. For example, one coating layer could comprise an oxidation catalyst composition without any optional sorbent compositions and a second layer could include (or consist entirely of) one or more optional sorbent compositions. Thus, discussion related to different layers may correspond to any of these layers. The catalytic coating may comprise one, or two, or three, or more coating layers. The one or more coating layers together comprise the three catalytic compositions.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where, for example, a coating layer extends the entire length of the substrate and a different coating layer extends from the outlet end a certain length and overlays a portion of the first coating layer, there are upstream and downstream zones.

Different coating layers may be in direct contact with the substrate. Alternatively, one or more "undercoats" may be present, so that at least a portion a catalytic coating layer or coating layers are not in direct contact with the substrate (but rather with the undercoat). One or more "overcoats" may also be present, so that at least a portion of the functional coating layer or layers are not directly exposed to a gaseous stream or atmosphere (but rather are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer."

An undercoat is a layer "under" a coating layer, an overcoat is a layer "over" a coating layer and an interlayer is a layer "between" two coating layers.

The interlayer(s), undercoat(s) and overcoat(s) may contain one or more functional compositions or may be free of functional compositions.

The present catalytic coatings may comprise more than one identical layers.

Figure 4B:
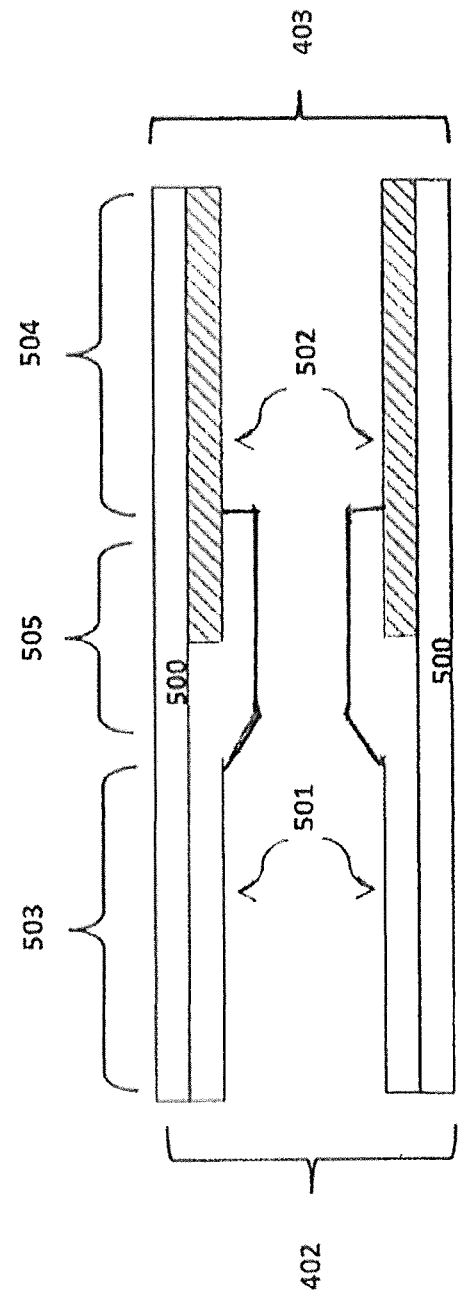
Figure 4C:
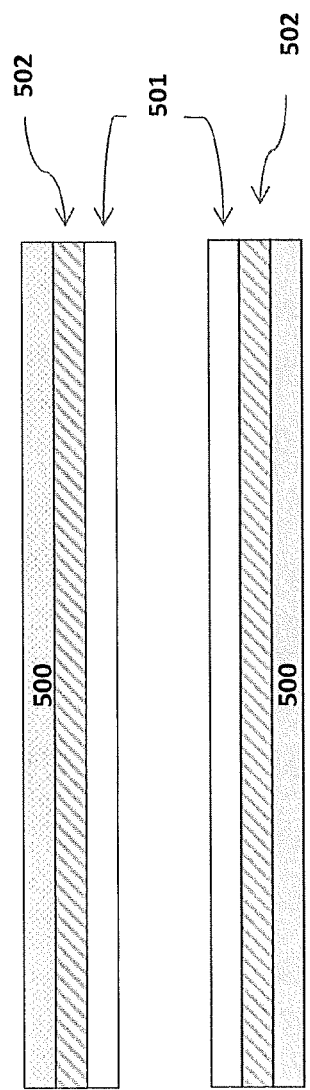

In some embodiments, the substrate may have, for example, two coating layers, e.g., one oxidation catalyst material as described herein and a second catalyst material (which can be an oxidation catalyst material or can be another type of catalyst material. FIGS. 4A, 4B, and 4C show some possible coating layer configurations for a substrate with two such coating layers. Shown are substrate walls 500 onto which coating layers 501 and 502 are disposed. This is a simplified illustration, and in the case of a porous wall-flow substrate, not shown are pores and coatings in adherence to pore walls and not shown are plugged ends. In FIG. 4A, coating layer 501 (e.g., the oxidation catalyst material) extends from the inlet 402 to the outlet 403 about 50% of the substrate length; and coating layer 502 (e.g., the second catalyst material) extends from the outlet to the inlet about 50% of the substrate length and the coating layers are adjacent each other, providing an inlet upstream zone 503 and an outlet downstream zone 504. In FIG. 4B, coating layer 502 (e.g., the second catalyst material) extends from the outlet about 50% of the substrate length and layer 501 (e.g., the oxidation catalyst material) extends from the inlet greater than 50% of the length and overlays a portion of layer 502, providing an upstream zone 503, a middle zone 505 and a downstream zone 504. In FIG. 4C, coating layers 501 and 502 each extend the entire length of the substrate with layer 501 overlaying layer 502. The substrate of FIG. 4C does not contain a zoned coating configuration. FIGS. 4A, 4B and 4C may be useful to illustrate coating compositions on the wall-flow substrate or the flow-through substrate of an oxidation catalytic article.

Exhaust Gas Treatment Systems

As noted above, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. Accordingly, an aspect of the present invention is directed to an exhaust gas treatment system and methods.

Accordingly, the present disclosure provides an exhaust gas treatment system comprising one or more of a hydrogen generator, a hydrogen injection article, an oxidation catalyst and an internal combustion engine, as disclosed herein. The system may further comprise, for example, a Selective Catalytic Reduction (SCR) article, a Catalyzed Soot Filter (CSF), and an ammonia oxidation (AMOx) catalyst article.

The disclosure also provides a method for on-board vehicle generation of hydrogen, comprising splitting water into hydrogen and oxygen in a water-splitting article. In some embodiments, the method further comprises introducing the hydrogen into an exhaust gas stream of an internal combustion engine, for example, upstream from an oxidation catalyst.

The present system may suitably contain, in addition to the one or more catalytic articles, one or more hydrogen injection articles configured to introduce hydrogen into an exhaust gas stream, for instance, wherein the injection article comprises a check valve. The hydrogen injection article may introduce hydrogen into an exhaust gas stream of an internal combustion engine where it will suitably function as a reductant in certain catalytic processes and/or catalyst regeneration processes. The hydrogen injection article may be in fluid communication with an oxidation catalyst and configured to introduce hydrogen upstream of the oxidation catalyst, for example a diesel oxidation catalyst (DOC). The hydrogen injection article will typically be downstream of and in fluid communication with an internal combustion engine. Hydrogen may advantageously be "pulsed" or released intermittently into the exhaust gas stream to perform a desired reducing function upon demand (on-demand).

In the present exhaust gas treatment system and methods, the exhaust gas stream is passed through a catalytic article or treatment system by entering the upstream end and exiting the downstream end. The inlet end of an article is synonymous with the "upstream" end or "front" end. The outlet end is synonymous with the "downstream" end or "rear" end. The treatment system is, in general, downstream of and in fluid communication with an internal combustion engine (e.g., a diesel engine).

The system may advantageously be integrated into an engine electronic management algorithm (electronic management system), for instance, as done for urea injections for SCR functions.

Figure 5:
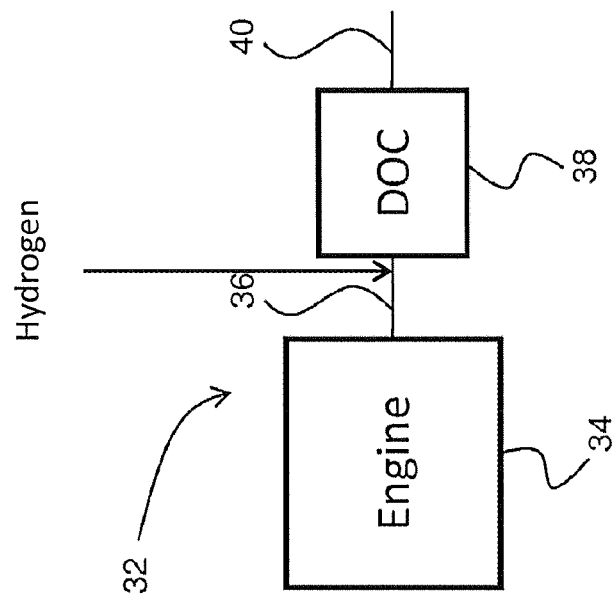
FIG. 5 is a schematic depiction of an embodiment of an emission treatment system downstream of and in fluid communication with an internal combustion engine in which hydrogen injection is utilized.

One exemplary emissions treatment system is illustrated in FIG. 5, which depicts a schematic representation of an emission treatment system 32, downstream of and in fluid communication with an internal combustion engine 34. As shown, an exhaust gas stream containing gaseous pollutants and particulate matter is conveyed via exhaust pipe 36 from an engine 34 to a diesel oxidation catalyst (DOC) 38. Other articles not shown may therefore include reservoirs, pumps, valves, mixing boxes, etc.

The exhaust gas treatment system may comprise a hydrogen injection article, configured to inject or release hydrogen upstream of the oxidation catalyst unit 38. For example, the hydrogen injection article can be configured for intermittent introduction of stored hydrogen into an exhaust gas stream. The system may be configured, for example, to introduce stored hydrogen during a cold-start period. In some embodiments, the hydrogen injection article comprises a check valve. Hydrogen may be brought on-board in a hydrogen storage article, or may be generated on-board from water-splitting or from ammonia decomposition. An embodiment of a suitable system for water-splitting is described herein and depicted in FIG. 1.

The exhaust stream is next conveyed via exhaust pipe 40 to optional downstream components, such as, for example, a Catalyzed Soot Filter (CSF) and/or a Selective Catalytic Reduction (SCR) article, not shown. Exemplary CSF and SCR components are disclosed, for example, in U.S. Pat. Nos. 9,757,717, 9,517,456, and 7,704,475 each of which is incorporated herein by reference.

The oxidation catalyst composition of DOC 38 is suitable for example to oxidize NO and/or CO and/or HC components of exhaust gas. In the optional DOC 38, unburned gaseous and non-volatile hydrocarbons and carbon monoxide are largely combusted to form carbon dioxide and water. In addition, a proportion of the NO of the $NO_x$ component may be oxidized to $NO_2$ in the DOC. Suitable oxidation catalyst compositions advantageously comprise a platinum group metal (PGM) dispersed on a refractory metal oxide support, as disclosed herein. The oxidation catalyst composition of DOC 38 may be coated on a flow-through monolith substrate or a wall-flow filter substrate as described herein.

The DOC unit is advantageously in a close-coupled position. A close-coupled position is, for instance, within about 12 inches (in) from the exhaust manifold (i.e., where individual cylinder exhaust pipes join together). In some embodiments, the distance from the exhaust manifold to the upstream end of the DOC unit is from about 0.5 in to about 12 inches. In some embodiments, the distance is about 0.5 in, about 1 in, about 2 in, about 3 in, about 4 in, about 5 in, about 6 in, about 7 in, about 8 in, about 9 in, about 10 in, about 11 in or about 12 in. In some embodiments, the distance is from about 0.5 in, from about 1 in, from about 2 in, from about 3 in, from about 4 in or from about 5 in to about 6 in, to about 7 in, to about 8 in, to about 9 in, to about 10 in, to about 11 in or to about 12 in, with each combination of lower endpoint and upper endpoint explicitly defining a range that is contemplated as an embodiment of the invention.

Exhaust Gas Treatment Methods

In one aspect is provided a method for abatement of pollutants in an exhaust gas stream of an internal combustion engine, the method comprising introducing stored hydrogen into the exhaust stream downstream of the internal combustion engine and upstream of a catalytic article.

In some embodiments, hydrogen is pulsed into the exhaust gas stream upstream of an oxidation catalyst composition, for example a diesel oxidation catalyst (DOC) as described herein above, during a cold-start period (i.e., the exhaust gas stream temperature is ≤150° C.). Hydrogen serves to enhance low temperature oxidation NO and/or CO and/or HC pollutants. In some embodiments, the method is effective in providing an increase in % conversion of one or more of CO, HC and $NO_x$ relative to the % conversion in the absence of injection or release of stored hydrogen. In some embodiments, the increase in % conversion is ≥10%, ≥15%, ≥20%, ≥25%, ≥30%, ≥35%, ≥40%, ≥45%, ≥50%, ≥55% or ≥60%. In some embodiments, the method further comprises generating hydrogen on-board a vehicle. In some embodiments, the method further comprises generating hydrogen on-board a vehicle upon instruction from a vehicle electronic management system. In some embodiments, the method comprises generating hydrogen on-board a vehicle in a water-splitting article or an ammonia decomposition article.

In some embodiments, generating hydrogen comprises collecting and/or storing water, splitting water into hydrogen and oxygen, collecting hydrogen and storing hydrogen. In some embodiments, the method comprises introducing stored hydrogen via a hydrogen injection article. In some embodiments, the hydrogen injection article comprises a check valve.

The present articles, systems and methods are suitable for treatment of exhaust gas streams from mobile emissions sources such as trucks and automobiles. Articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

Aspects of the present invention are more fully illustrated by the following examples, which are set forth to illustrate certain aspects of the present invention and are not to be construed as limiting thereof.

Example 1

Two-Layer Catalytic Coating on Substrate (DOC Article)

A bottom coat catalyst slurry containing milled alumina powder impregnated with Pd (0.5 wt. %), Ba (0.8 wt. %) and Pt (0.3 wt. %) was prepared and adjusted to a pH of 4.5 to 5.0 with nitric acid. The bottom coat slurry had a solid content of 38 wt. %. The bottom coat slurry was applied to the entire core length of a 1"×3", 400 cpsi (cell per square inch) honeycomb substrate via a washcoat technique. The coated substrate was air dried at 120° C. and calcined at 500° C. for 1 hour, providing a coating loading of 1.6 g/in$^3$.

A top coat slurry containing alumina/5 wt. % Mn and Pt-amine (3.3 wt. %) was prepared, milled and adjusted to a pH of 4.5 to 5.0 with nitric acid. The top coat slurry had a solid concentration 37 wt. %. Zeolite beta (0.35 g/in$^3$) was then added to the top coat slurry. The top coat slurry was applied over the entire bottom coat and was dried and calcined as the bottom coat, to provide a total coating loading of 2.5 g/in$^3$ and a total PGM loading of 50 g/ft$^3$ with a Pt/Pd weight ratio of 3/1.

Example 2

Exhaust Gas Treatment

The coated cores were hydrothermally aged in a tube furnace at 800° C. for 16 hours with a feed gas composition of 10% $H_2O$, 10% $O_2$, balance $N_2$. The aged Example 1 was evaluated under a steady state light-off test with a feed composition having 1500 ppm CO, 100 ppm NO, 10% $H_2O$, 4.6% $CO_2$, 14% $O_2$, 40 ppm $C_3H_6$, 30 ppm $CH_4$ and 294 ppm C1 (liquid HC having a molar ratio of 64/36 decane/toluene). The temperature ramp was 20° C./min from ca. 80° C. to 380° C. Light-off results (° C.) were as follows:

|  | CO ($T_{50}$) | CO ($T_{80}$) | HC ($T_{80}$) |
| --- | --- | --- | --- |
| no $H_2$ | 186 | 193 | 210 |
| 1% $H_2$ up to 180° C. | 153 | 158 | 173 |

The data demonstrate that hydrogen injection is highly effective towards the abatement of pollutants in an exhaust gas stream.

What is claimed is:

1. A vehicle on-board system comprising:
   a water-splitting article configured to split water into hydrogen and oxygen; and
   a hydrogen injection article configured to inject or release the generated hydrogen into the exhaust gas stream;
   wherein the water-splitting article comprises a photochemical cell.

2. The vehicle on-board system of claim 1, further comprising a water collection article configured to collect and/or store water, wherein the water collection article is associated with the water-splitting article.

3. The vehicle on-board system of claim 2, further comprising a condenser configured to condense atmospheric water, wherein the water collection article is configured to collect and/or store the condensed atmospheric water.

4. The vehicle on-board system of claim 2, further comprising a heating article associated with the water collection article and the water-splitting article, the heating article configured to convert collected and/or stored water to steam.

5. The vehicle on-board system of claim 4, wherein the water-splitting article is configured to split steam into hydrogen and oxygen.

6. The vehicle on-board system of claim 1, further comprising a battery associated with the water-splitting article.

7. The vehicle on-board system of claim 1, further comprising a hydrogen collection article configured to collect hydrogen, wherein the hydrogen collection article is associated with the water-splitting article.

8. The vehicle on-board system of claim 7, further comprising a hydrogen storage article associated with the hydrogen collection article and configured to store hydrogen.

9. The system of claim 1, wherein the hydrogen injection article is downstream of and in fluid communication with an internal combustion engine, is in fluid communication with an oxidation catalyst, and is configured to introduce hydrogen intermittently on-demand upstream of the oxidation catalyst.

10. The system of claim 1, wherein the system is integrated with a vehicle electronic management system.

11. The system of claim 1, configured to inject or release hydrogen into an exhaust gas stream with a temperature of ≤150° C.

12. A method for on-board vehicle generation of hydrogen, the method comprising:
    collecting water with a water collection article configured to collect and/or store water;
    splitting water with a water-splitting article associated with the water collection article and configured to split water into hydrogen and oxygen, wherein the water-splitting article comprises a photochemical cell;
    collecting hydrogen with a hydrogen collection article associated with the water-splitting article and configured to collect hydrogen;
    storing hydrogen with a hydrogen storage article associated with the hydrogen collection article and configured to store hydrogen; and
    introducing the stored hydrogen into an exhaust gas stream of an internal combustion engine with a hydrogen injection article associated with the hydrogen storage article and configured to inject or release stored hydrogen into the exhaust gas stream of an internal combustion engine.

13. A vehicle comprising the system of claim 1.

14. A method for on-board vehicle generation of hydrogen, the method comprising:
    heating water to form steam and routing the steam to a water-splitting article, wherein the water-splitting article is configured to split steam into hydrogen and oxygen;
    splitting the steam into hydrogen and oxygen in the water-splitting article;
    collecting the hydrogen; and, optionally,
    storing the hydrogen in a hydrogen storage article.

15. The method of claim 14, further comprising collecting water from the atmosphere with a condenser.

16. The method of claim 14, comprising splitting the steam into hydrogen and oxygen electrochemically in an electrolytic cell.

17. The method of claim 14, further comprising introducing the hydrogen into an exhaust gas stream of an internal combustion engine.

18. The method of claim 12, further comprising generating and/or introducing hydrogen into an exhaust gas stream of an internal combustion engine upon instructions from a vehicle electronic management system.

19. A vehicle on-board system comprising:
- a water-splitting article configured to split steam into hydrogen and oxygen;
- a water collection article configured to collect and/or store water, wherein the water collection article is associated with the water-splitting article;
- a heating article associated with the water collection article and the water-splitting article, the heating article configured to convert collected and/or stored water to steam; and
- a hydrogen injection article configured to inject or release the generated hydrogen into the exhaust gas stream.

20. The vehicle on-board system of claim 19, wherein the water-splitting article comprises an electrolytic cell.

21. The vehicle on-board system of claim 19, wherein the water-splitting article comprises a photochemical cell.

\* \* \* \* \*